(12) United States Patent
Dey

(10) Patent No.: US 11,789,787 B2
(45) Date of Patent: Oct. 17, 2023

(54) COMMUNICATING BETWEEN APPLICATIONS USING API MAPPING

(71) Applicant: Oracle International Corporation, Redwood Shores, CA (US)

(72) Inventor: Debdulal Dey, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 17/383,341

(22) Filed: Jul. 22, 2021

(65) Prior Publication Data

US 2022/0391267 A1 Dec. 8, 2022

Related U.S. Application Data

(60) Provisional application No. 63/202,290, filed on Jun. 4, 2021.

(51) Int. Cl.
*G06F 9/54* (2006.01)
*G06F 16/903* (2019.01)
*H04L 67/133* (2022.01)
*H04L 67/565* (2022.01)

(52) U.S. Cl.
CPC ........ *G06F 9/541* (2013.01); *G06F 16/90335* (2019.01); *H04L 67/133* (2022.05); *H04L 67/565* (2022.05)

(58) Field of Classification Search
CPC .... G06F 9/541; G06F 16/90335; G06F 9/547; G06F 8/76; G06F 16/88; H04L 67/133; H04L 67/565
See application file for complete search history.

(56) References Cited

U.S. PATENT DOCUMENTS

| 7,681,184 | B1 * | 3/2010 | Weedon | G06F 8/51 |
| | | | | 717/137 |
| 11,647,095 | B1 * | 5/2023 | Barsade | H04L 67/565 |
| | | | | 709/217 |
| 2006/0156314 | A1 * | 7/2006 | Waldorf | G06F 9/4484 |
| | | | | 712/E9.082 |
| 2016/0301739 | A1 * | 10/2016 | Thompson | H04L 67/561 |
| 2016/0308933 | A1 * | 10/2016 | Grant | H04L 67/565 |
| 2018/0004585 | A1 * | 1/2018 | Aguilar Mares | G06F 9/45558 |
| 2018/0218368 | A1 * | 8/2018 | Rao | H04L 69/08 |

* cited by examiner

*Primary Examiner* — Syed A Roni
(74) *Attorney, Agent, or Firm* — Invoke

(57) ABSTRACT

Techniques for stitching application programming interfaces (APIs) to communicate between applications are disclosed. Stitching APIs includes transferring data obtained using an API corresponding to a source application and an API corresponding to a destination. A system obtains a mapping file that maps data objects maintained by the source application to data objects maintained by the destination application. When the system receives a data transfer request, the system: (a) identifies the source application and the destination application, (b) identifies the mapping between objects maintained by the source application and objects maintained by the destination application, and (c) identifies the API calls for the source application and the destination application for performing the data transfer. Based on the mapping, the system invokes API calls to a source application and a destination application to transmit the data.

15 Claims, 7 Drawing Sheets

COMMUNICATING BETWEEN APPLICATIONS USING API MAPPING

INCORPORATION BY REFERENCE

This application claims the benefit of U.S. Provisional Patent Application 63/202,290, filed on Jun. 4, 2021, which is hereby incorporated by reference.

TECHNICAL FIELD

The present disclosure relates to communicating between applications using API mapping. In particular, the present disclosure relates to mapping one or more objects between applications associated with a data transfer request. A system maps a data object of a source application to an object type specified by an API of a destination application to allow the source application and the destination application to communicate with each other.

BACKGROUND

Applications may communicate with each other using APIs. In an example, a first application calls the API of a second application to send data from the first application to the second application, or to have the second application perform some function using the data. However, a particular application may not be able to communicate with a target application if the particular application is not coded based on the API of the target application. In another example, a first application may publish events for consumption by other applications. However, consumption by a target application may transformation of the data objects corresponding to the event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
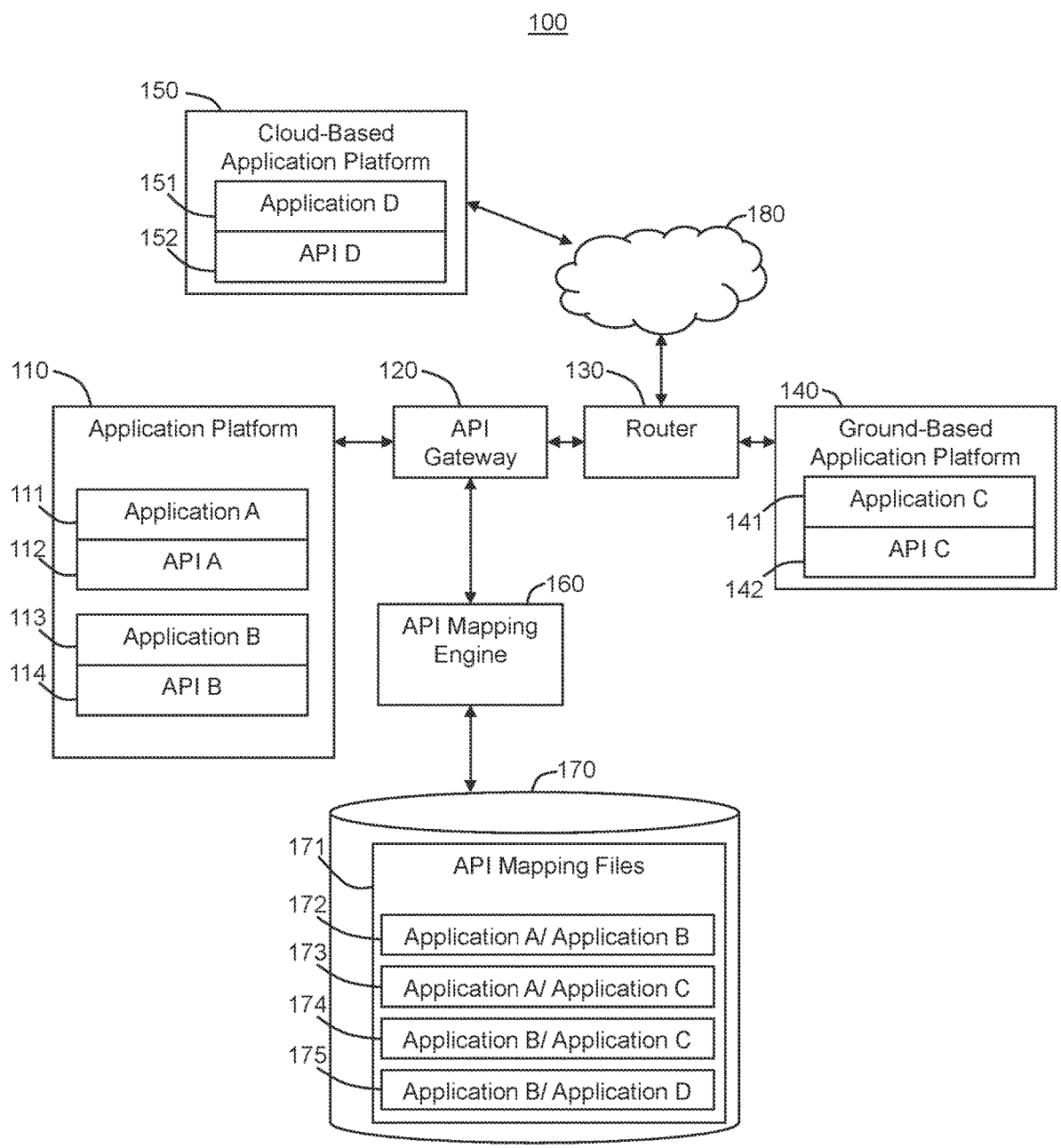
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. COMMUNICATING BETWEEN APPLICATIONS USING API MAPPING
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

An Application Programming Interface (API) corresponding to an application facilitates communication between that application and other external applications. An application API specifies a set of methods or functions that may be invoked for execution by the application. A method definition in an API includes a name of the method, types/numbers of arguments, and may include a return value.

One or more embodiments stitch APIs corresponding to different applications to transfer data between the applications. Stitching APIs includes transferring data obtained using an API corresponding to a source application (referred to herein as a "source API") and an API corresponding to a destination application (referred to herein as a "destination API"). A system obtains a mapping file that maps data objects maintained by the source application to data objects maintained by the destination application. When the system receives a data transfer request, the system: (a) identifies the source application and the destination application, (b) identifies the mapping between objects maintained by the source application and objects maintained by the destination application, and (c) identifies the API calls for the source application and the destination application for performing the data transfer. Based on the mapping, the system invokes an API call to a source application to obtain a data object from a source application and invokes an API call to a target application to transmit the data object to the target application.

In an embodiment, the system adapts/modifies the data object, obtained from the source application, prior to transmission to the destination application. Upon executing an API call to the source application to obtain a data object, the system migrates the data object to a type specified by the destination application. In one embodiment, migrating the data object from the one object type to another object type includes migrating fields of the one data object to fields of another data object. The system may migrate the data object by identifying field names, field types, field contents, or field attributes. For example, an object in the source application may store a value of a type "Double", while the object in the destination application may store a corresponding value of type "Integer." Migrating the first object to the second object may include converting the value from a "Double" to an "Integer".

Migrating the data object may include omitting from a request one or more fields or one or more values. For example, a data object maintained by the source application may include a "date" attribute and value. The mapped data object maintained by the destination application may omit any "date" attribute. Migrating the data object may include omitting the "date" attribute from the data object prior to invoking the API call to transmit the data object to the destination application.

Migrating the data object may further include migrating to a new type that has additional fields than an original type corresponding to the data object. The values of an initial data object of a first type may be copied to a new data object of a second type that has more fields than the first type. The fields in the second type, that do not have any corresponding fields in the first type, may be initialed to a null value or zero.

One or more embodiments identify an API call for performing the data transfer request by determining a path for a resource that stores a data object associated with the data transfer request. One or more embodiments include, upon receiving a data transfer request and identifying the applications associated with the data request, determining whether an incompatibility exists between data objects maintained by the applications. The system may search for, or request, a mapping based on determining the incompatibility exists.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes an application platform 110, an application programming interface (API) gateway 120, a router 130, a ground-based application platform 140, a cloud-based application platform 150, an API mapping engine 160, and a data repository 170. In one or more embodiments, a data repository 170 is any type of storage unit and/or device (e.g., a file system, database, collection of tables, or any other storage mechanism) for storing data. Further, a data repository 170 may include multiple different storage units and/or devices. The multiple different storage units and/or devices may or may not be of the same type or located at the same physical site. Further, a data repository 170 may be implemented or may execute on the same computing system as the application platform 110, the API gateway 120, the API mapping engine 160, or the router 130. Alternatively, or additionally, a data repository 170 may be implemented or executed on a computing system separate from application platform 110, the API gateway 120, the API mapping engine 160, or the router 130. A data repository 170 may be communicatively coupled to the application platform 110, the API gateway 120, the API mapping engine 160, or the router 130 via a direct connection or via a network.

Information describing API mapping files 171 may be implemented across any of components within the system 100. However, this information is illustrated within the data repository 170 for purposes of clarity and explanation.

The application platform 110 hosts application A 111 and application B 113. Application A 111 includes an API A 112. API A 112 specifies one or more functions or methods that application A 111 performs when a corresponding API call is invoked. The API A 112 specifies a name of the function, the arguments associated with the function, and any return value. The arguments associated with the function include data types and values required by the application A 111 for the application A 111 to perform the corresponding function. Examples of data types, formats, and characteristics that may be specified by the API include data object names, object types, data object field names, field types, attribute names, attribute types, and attribute values. Similarly, API B 114 specifies one or more functions performed by Application B 113.

The router 130 routes data traffic between the network 180 and the application platform 110 and the ground-based application platform 140. The API gateway 120 receives requests from the router 130 and routes requests from the router to the appropriate applications 111 or 113. The API gateway 120 may further perform authentication and authorization of requests directed to the applications 111 and 113. In addition, in an embodiment in which an application 111 or 113 is divided into multiple microservices, the API gateway 120 may further route requests to particular microservices within the applications 111 and 113. The API gateway 120 may further generate multiple API calls to an application 111 or 113 based on a single received request. The API gateway 120 may consolidate the data returned from the multiple calls into a single response.

External platforms that transmit requests to the router include the ground-based application platform 140 and the cloud-based application platform 150 which is connected to the router 130 via the network 180. The ground-based application platform 140 refers to an entity that hosts an application 141 and API C 142 on-site. For example, a company may have internal applications that are not hosted on a server on the cloud, but are instead stored in a server at the company's campus. The cloud-based application platform 150 refers to a cloud-based application D 151 and corresponding API D 152. A cloud-based application 151 is stored in a server remote from the users. The users access the application 151 via a network 180, such as the Internet.

When the API gateway 120 receives a data transfer request, the API gateway 120 identifies a source application from which data is to be obtained and a destination application to which the source application is intended to transmit the data. The API mapping engine 160 provides an API mapping file to the API gateway 120. The API mapping file maps data objects maintained by the source application to data objects maintained by the destination application.

The API mapping engine 160 retrieves the API mapping file from the data repository 170. The data repository 170 stores API mapping files 171 mapping application pairs. In the example in FIG. 1, the API mapping files 171 include a mapping 172 of application A to application B; a mapping 173 of application A to application C; a mapping 174 of application B to application C; and a mapping 175 of application B to application D. In one or more embodiments, the APIs 112, 114, 142, and 152 are representational state transfer (REST) APIs and the mappings 172, 173, 174, and 175 are JavaScript Object Notation (JSON) files.

When the API gateway 120 receives a data transfer request associated with application A 111 and application C 141, the API mapping engine 160 retrieves the mapping 173. The API gateway 120 migrates data from the source application. For example, if application C 141 is the source application, the API gateway 120 executes a query to identify an API call specified by the API C 142 that retrieves a data object identified in the data transfer request. The API gateway 120 invokes the API call to migrate the data object from the application C 141. The API gateway 120 refers to the mapping 173 to identify a data object maintained by the application A 111 that corresponds to the data object maintained by the application C 141. The API gateway 120 executes another query to identify an API call specified by the API A 112 that would transmit a data object to the application A 111. The API gateway 120 invokes the API call to transmit the data object to application A 111.

The API gateway 120 and API mapping engine 160 perform a similar process to map data objects, fields, attributes, and values between any two applications having mapping files 171 stored in the data repository 170 to facilitate communication between the applications.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, the application platform 110, API gateway 120, and API translation engine 160 refers to hardware and/or software configured to perform operations described herein for mapping objects between APIs. Examples of operations for mapping objects between APIs are described below with reference to FIGS. 2A and 2B.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Communicating Between Applications Using API Mapping

Figure 2A:
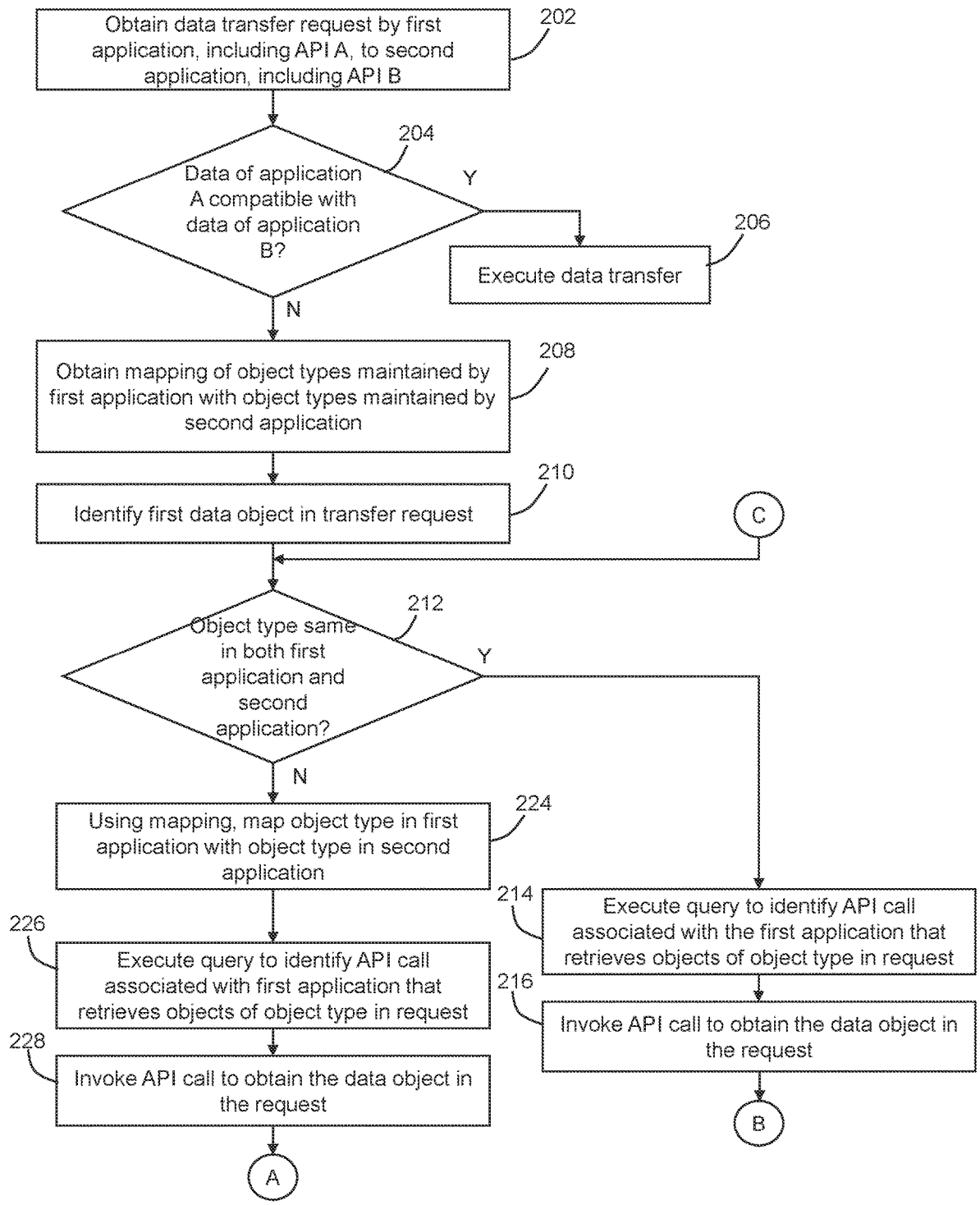
FIGS. 2A and 2B illustrate an example set of operations for communicating between applications using API mapping in accordance with one or more embodiments.
Figure 2B:
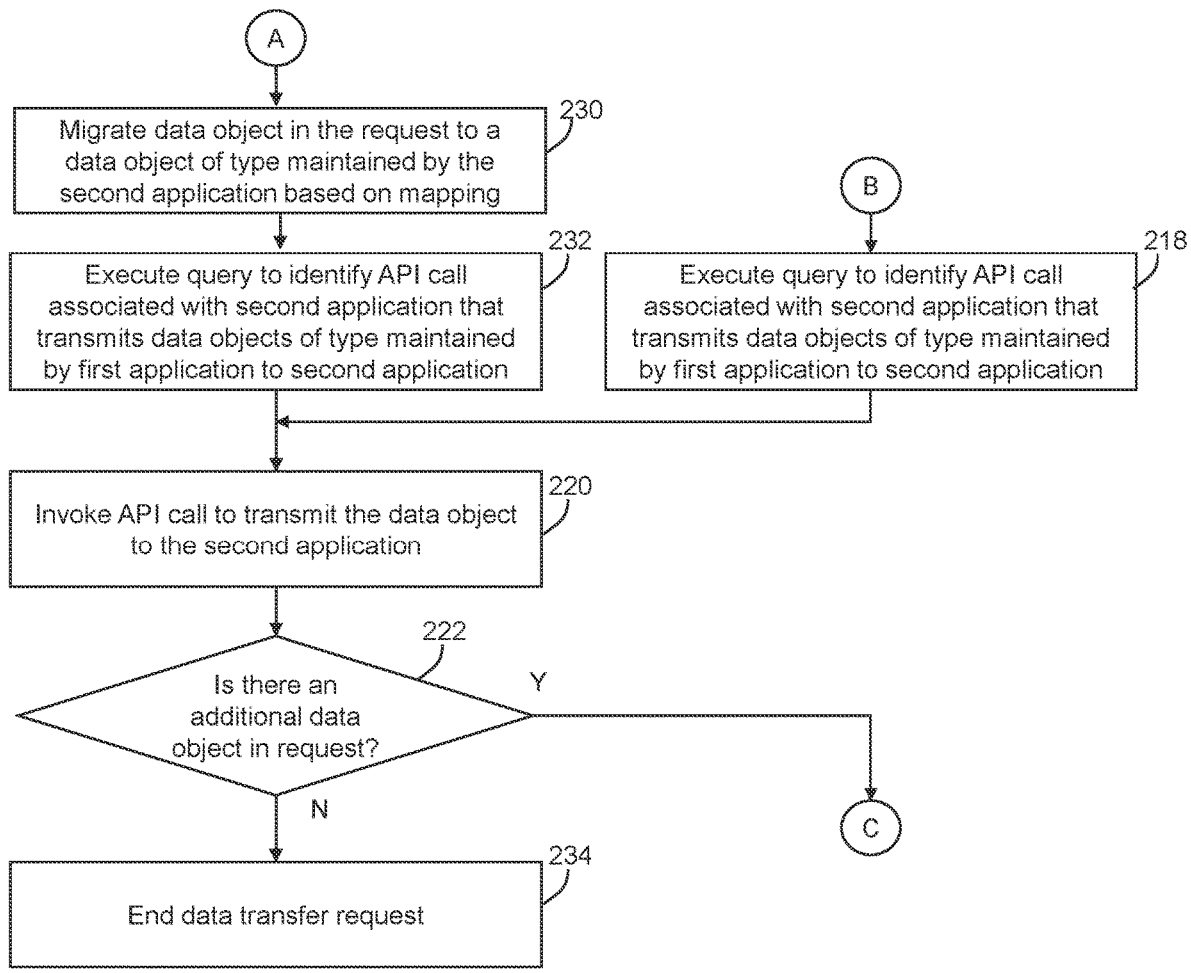

FIGS. 2A and 2B illustrate an example set of operations for communicating between applications using API mapping in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system obtains a data transfer request to transfer data from a first application, having functions specified by a first API (API A), to a second application, having function specified by a second API (API B) (Operation 202). In one embodiment, both the first API and the second API are REST APIs.

The system determines whether the data objects maintained by the first application are compatible with data objects maintained by the second application (Operation 204). Determining whether the data objects are compatible may include analyzing protocols and functions specified by the respective APIs to determine if data maintained by the respective applications has the same format. Alternatively, the system may first search a data repository to determine whether a mapping exists for the applications. If the mapping exists, the system may determine that the data objects in the applications are not compatible.

The system may analyze the applications to determine whether the same data elements (e.g., data objects, data fields, attributes, and values) are the same and are represented in the same way. For example, a data object "photograph1" maintained by one application may be of an object type "media," based on a naming protocol of the first application. The system may determine whether a corresponding object type "media" exists in the second application. In addition, the system may determine whether specified objects include the same fields and represent data in the same format in the same fields. For example, both the first and second applications include an object having a field type "date." However, the first application may store a data value in a format "MM/DD/YY" while the second application may store a date value in the format "YYYY/MM/DD." Accordingly, the system may identify whether the objects, fields, attributes, and values are specified the same way in the first and second applications.

If the applications store data in a manner that is compatible, the system executes the data transfer based on the data transfer request (Operation 206). The system determines that the applications are compatible if each data element is specified in the same way in the applications. Executing the data transfer may include invoking an API call to the first application to obtain data, and invoking an API call to the second application to transfer the data to the second application. Executing the data transfer may further include invoking another set of API calls to obtain output data from the second application as a result of the data transfer request. For example, the data transfer request may include an API call to cause the second application to receive data, perform a function, and output a result to the first application. Alternatively, the data transfer request may include only an API call to transmit data from the first application to the second application to cause the second application to perform a function.

If the system determines that the applications store data in a manner that is not compatible (e.g., objects or fields have different names, units, etc.), the system obtains a mapping between the first application and the second application (Operation 208). The system determines that the applications are not compatible if any data element is specified differently in one of the applications than in the other application. The mapping may be previously stored in a data repository. For example, an API gateway may analyze a data transfer request and may identify the first application and the second application. The API gateway may determine that at least one data element in the data transfer request is not compatible between the applications. The API gateway may then obtain the API mapping between the first application and the second application from a data repository. The API mapping may be provided by a user, such as a developer, prior to the data transfer request. Alternatively, the system may request a mapping from a source application of the data transfer request upon determining that at least one data element in the data transfer request is not compatible between the applications.

In another embodiment, the system stores multiple mappings of application pairs in a single data repository. For example, if one application platform runs two applications, and if the two applications are known to communicate with three applications in external platforms, the system may store each application pairing (up to ten API mappings) in a same data repository. Any time one of the applications requests a data transfer operation with another application, the system obtains the corresponding mapping from the data repository.

In one embodiment, each API is a REST API, and each mapping is a JSON file.

The system identifies a first data object in the data transfer request (Operation 210). The system determines if an object type for the data object is specified in the second application with the same data and format as in the first application (Operation 212). For example, two applications may maintain three data objects. One of the data objects may have the same format in both applications, while two of the data objects may have different data formats. If the system determines that a data object is specified the same in both the first application and the second application, no mapping is required. The system executes a query to identify an API call, associated with the first application, for retrieving the data object specified in the data transfer request (Operation 214). Identifying the API call for retrieving the data object may include identifying a path for a resource that stores the data object.

Based on identifying the API call specified by the first API, the system invokes the API call to obtain the data object from the first application (Operation 216). Invoking the API call includes providing to the first application a call to retrieve a data object having an object name that is the same as an object name stored by the first application.

The system executes a query to identify an API call associated with the second application that would transmit data objects of the specified object type to the second application (Operation 218). The system invokes the API call to transmit the data object to the second application (Operation 220). Invoking the API call includes providing to the second application the object name having the same name as specified by the API call to cause the second application to receive the requested data. Since the object is defined in the same way in both the source application and the destination application, the object name is the same in both the API call to the source application and the API call to the destination application. In one or more embodiments, the second application returns data based on receiving the requested data. For example, the second application may perform one or more functions using the requested data and generate output data based on the functions. The system may transmit the output data to the first application, or to any other location specified by the data transfer request.

The system determines if the data transfer request includes another data object (Operation 222). If there is another object specified in the data transfer request, the system repeats operation 212 to determine if the data object is specified in the same way in both the source application and the destination application. In one or more embodiments, the data transfer request may include one or more objects that are compatible between both the first and the second applications and one or more objects that are incompatible. If a data object is compatible—having the same parameters and format—between the source application and the destination application, the system refrains from mapping the object. If the data object is incompatible—one or more parameters of the data object is specified differently between the first application and the second application—the system performs mapping to execute the data transfer request.

Based on determining that one or more characteristics of the data object maintained by the source application is different from the corresponding object maintained by the destination application, the system uses the mapping to map the data object to a corresponding data object specified in the second application (Operation 224). Mapping the data object may include identifying an object name or object type specified by the second application, and identifying a corresponding object name or object type specified by the first application.

The system executes a query to identify an API call, specified by the first API, for causing the first application to retrieve the data object specified in the data transfer request (Operation 226). Identifying the API call for retrieving the data object may include identifying a path for a resource that stores the data object.

Based on identifying the API call specified by the first API, the system invokes the API call cause the first application to obtain the data object (Operation 228).

The system migrates the data object obtained from the first application to a data object type specified in the second API for causing the second application to receive a data object (Operation 230). Migrating the data object may include changing a name of the data object. In one embodiment, migrating the data object to the type specified in the second API includes identifying fields in the data object obtained from the first application, identifying corresponding fields in the data object specified by the second API for receiving the data object by the second application, and mapping the fields of the data objects. Migrating the data object may further include mapping an object type, attribute name, attribute type, converting an attribute value, generating a data element, or omitting a data element.

The system executes a query to identify an API call specified by the second API that would cause the second application to receive a data object of the specified object type (Operation 230). The system invokes the API call to transmit the data object to the second application (Operation 220). In one or more embodiments, the second application returns data based on receiving the requested data. For example, the second application may perform one or more functions using the requested data and generate output data based on the functions. The system may transmit the output data to the first application, or to any other location specified by the data transfer request.

The system again determines if the data transfer request includes another data object (Operation 222). If the data transfer request includes no additional data objects, the data transfer is completed (Operation 234).

4. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
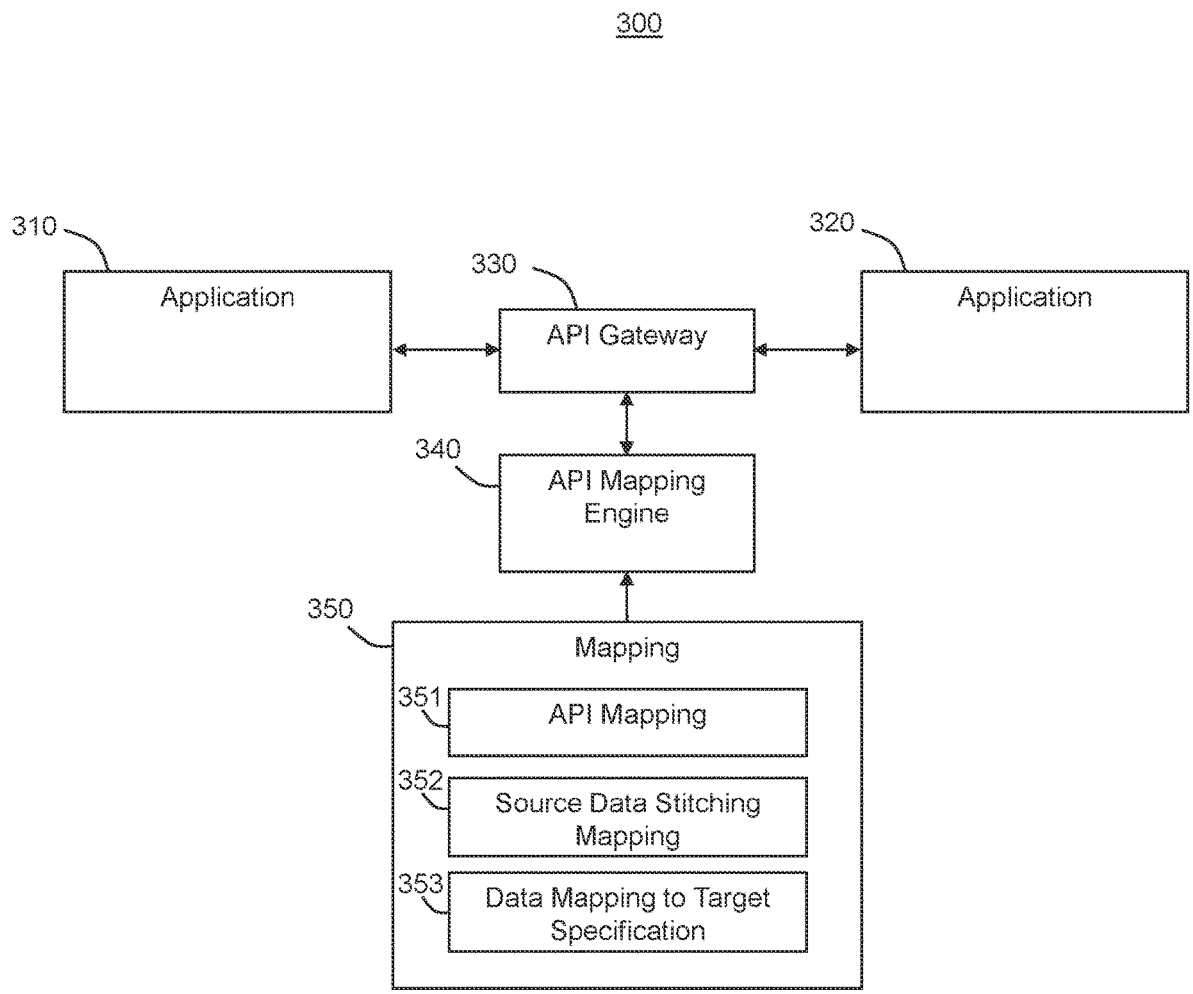
FIG. 3 illustrates an example of a system according to one embodiment.

FIG. 3 illustrates an example of a system according to one embodiment. The system 300 includes an application 310 in communication with application 320 via an API gateway 330. In an example embodiment, application 310 may be a target application and application 320 may be a source application. The API gateway 330 receives a request to obtain data from the source application 320 to provide to the target application 310. The request may originate from the target application 310 or from another application. For example, the target application 310 may transmit to the source application 320 a JSON request to create a data object to be maintained by the target application 310 using data maintained by the source application 320. The request may include an API path for the data object to be maintained by the target application 310. In an alternative example, the source application 320 may transmit to the target application 310 a JSON request to create the data object to be maintained by the target application 310 using data maintained by the source application 320. In yet another example, a third application (not shown) may initiate a request to transfer data between the source application 320 and the target application 310.

The API gateway 330 redirects the request to the API mapping engine 340. The API mapping engine 350 retrieves a mapping 350 between the target application 310 and the source application 320 to complete the request. The mapping 350 includes an API mapping 351, a source data stitching mapping 352, and a mapping 353 of the source data to the target specification. The API mapping 351 includes a mapping of an API path for the source data that is being requested. The API mapping engine 340 maps the API path of the target application 310 with the API path of the source application 320 by: (a) identifying the target API path in the request, and (b) locating a source API path mapped to the target API path in the API mapping 351. For example, if the data transfer request specifies a target application API path for generating an object "class" in the target application 310 using data from the source application 320, the API mapping engine 340 maps the target application API path to one or more API paths of the source application 320 for providing the data to create the object "class" in the target application 310.

Figure 4:
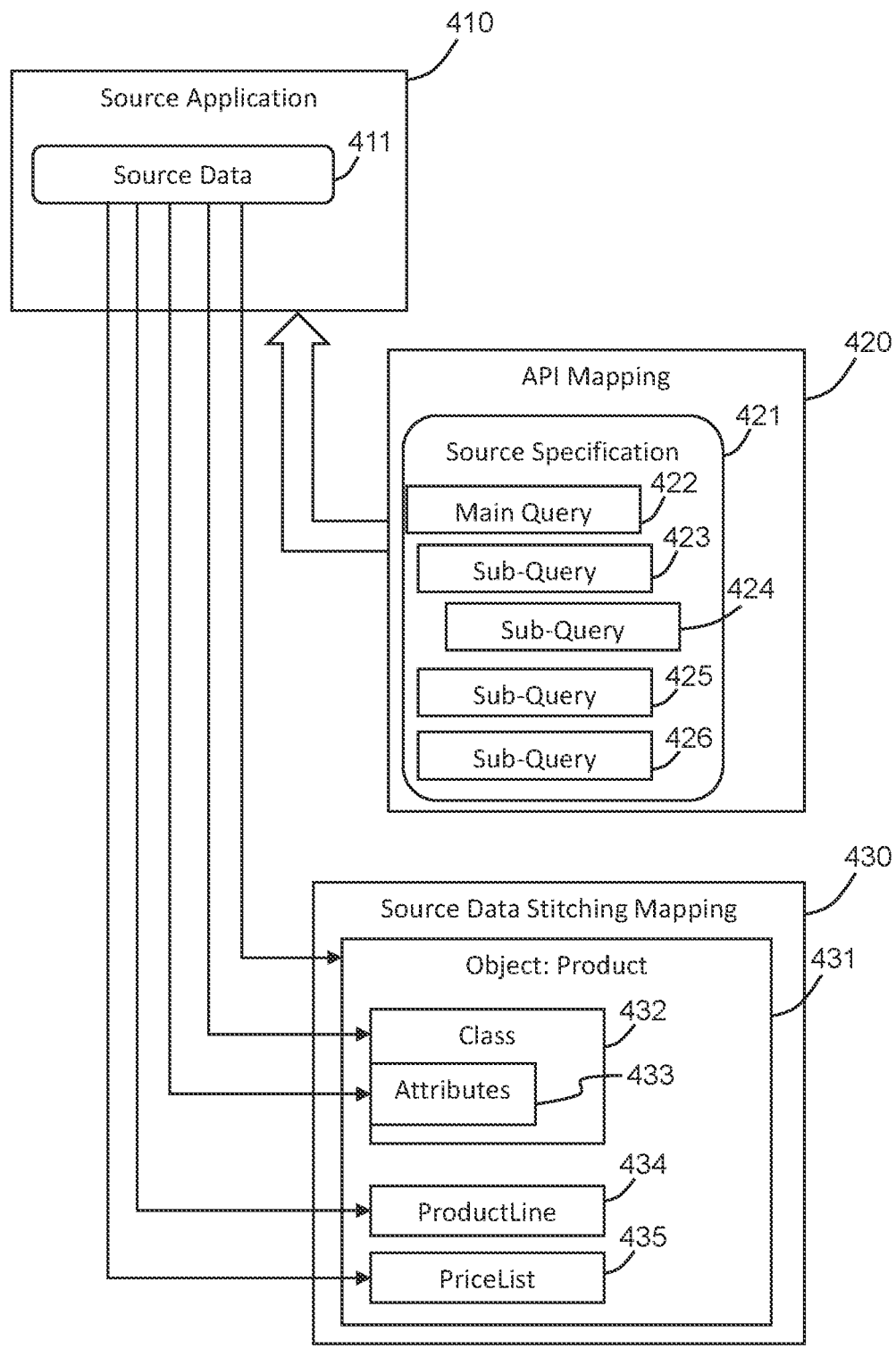
FIG. 4 illustrates an example of stitching source data according to one embodiment.

The API mapping engine 340 obtains the source data from the source application 320 using the source application API path. The API mapping engine 340 identifies, based on the source data stitching mapping 352, relationships among data objects maintained by the source application 320. For example, the API mapping engine 340 may identify a main data object and one or more sub-objects associated with the main data object. Based on the identified relationships among the data objects, the API mapping engine 340 executes queries to the source application 320 using API paths specified in the mapping 350 to obtain the data requested. In an alternative embodiment, the API mapping engine 340 executes one or more queries to an API of the source application to expose API functions for requesting the identified data objects. FIG. 4 illustrates an example of a process of generating queries based on API mapping and of stitching the obtained source data according to one embodiment.

An API mapping engine, such as the API mapping engine 340 of FIG. 3, identifies source data 411 maintained by a source application 410 requested in a data transfer request. An API mapping 420 includes a source specification 421 that describes how data is stored by the source application 410. The source specification 421 identifies, based on an API of the source application 410, a series of queries 422, 423, 424, 425, and 426 required to obtain the data to create the object "product." In the example illustrated in FIG. 4, the source specification 421 specifies a main query 422 to obtain data associated with the object "product" 431, a sub-query 423 to obtain data associated with an object "class" 432, and additional sub-queries 424, 425, and 426 to obtain data associated with the objects "attributes" 433, "ProductLine" 434, and "PriceList," 435, respectively. The API mapping 420 may specify API paths for each of the queries 422-426. The API mapping 420 may further specify an order in which to execute the queries 422-426. The API mapping engine may obtain the data using GET functions to API paths specified by the source application API, for example.

Upon querying the source application 410 to obtain the source data 411, the API mapping engine stitches the data according to the source data stitching mapping 430. Stitching the source data includes identifying relationships among objects and attributes, including hierarchal relationships, and storing the data according to the identified relationships. For example, the source data stitching mapping 430 specifies that a data object "class" 432 includes data defining an object "product" 431. In addition, a sub-object "Attributes" 433 includes data defining the object "Class" 432. The object "product" 431 further includes objects "ProductLine" 434 and "PriceList" 435.

Figure 5:
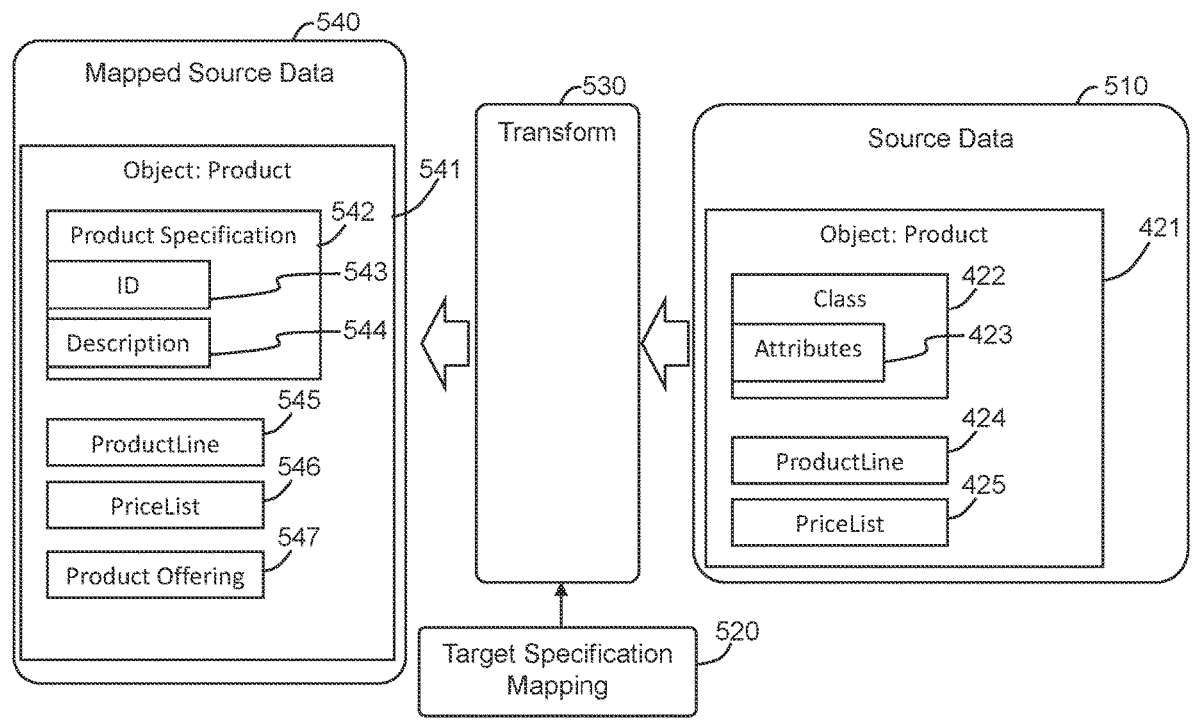
FIG. 5 illustrates an example mapping source data to a target specification according to one embodiment.

Referring to FIG. 3, the API mapping engine 340 maps the retrieved source data to a target specification using a mapping 353. FIG. 5 illustrates an example of mapping source data to a target specification according to one embodiment.

An API mapping engine, such as the API mapping engine 340 of FIG. 3, obtains source data 510 from a source application, such as the source application 320 of FIG. 3. In the example, embodiment illustrated in FIG. 5, the source data 510 includes the data object "product" 421 described in FIG. 4. The API mapping engine applies a target specification mapping 520 to transform 530 the source data 510 to mapped source data 540. The mapped source data 540 is formatted according to a target specification. In one embodiment, the target specification includes objects, attributes, and values specified by a target API. Transforming the source data 510 to the mapped source data 540 includes, for example: (a) changing object names and attribute names of the source data 510 to correspond to object names and attribute names specified in a target application specification, (b) mapping attribute values of one attribute in the source data 510 to a different attribute in the mapped source data 540, (c) applying a mathematical algorithm to attribute values of the source data 510 to generate different attribute values in the mapped source data 540, (c) applying logical functions on attribute values of the source data 510 to generate different attribute values in the mapped source data 540, (d) changing a format of attribute values in the source data 510 to generate formatted attribute values in the mapped source data 540, (e) combining attribute values of the source data 510 to generate new attributes in the mapped source data 540 having values based on the combined attribute values of the source data 510.

In the example illustrated in FIG. 5, the object "product" 421 of the source data 510 is transformed 530 to generate an object "product specification" 542 having associated sub-objects "ID" 543 and "description" 544 having values obtained from the object "attributes" 423 in the source data 510. In addition, a mapping engine generates an object "ProductLine" 545 from the object "ProductLine" 424 in the source data 510. The attribute values in the object "ProductLine" 545 may be based on the attribute values of the object "ProductLine" 424 in the source data 510. Likewise, an object "PriceList" 546 is generated based on the object "PriceList" 425 in the source data 510. The mapping engine may generate an object "Product Offering" 547 based on applying logical operations on the values in the object "ProductLine" 424 of the source data 510.

Referring to FIG. 3, the API mapping engine 340 provides the mapped source data to the API gateway 330 to provide the mapped source data to the target application 310. For example, the mapped source data may be transmitted to the target application 310 by one or more POST functions to one or more API paths specified in the data request.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
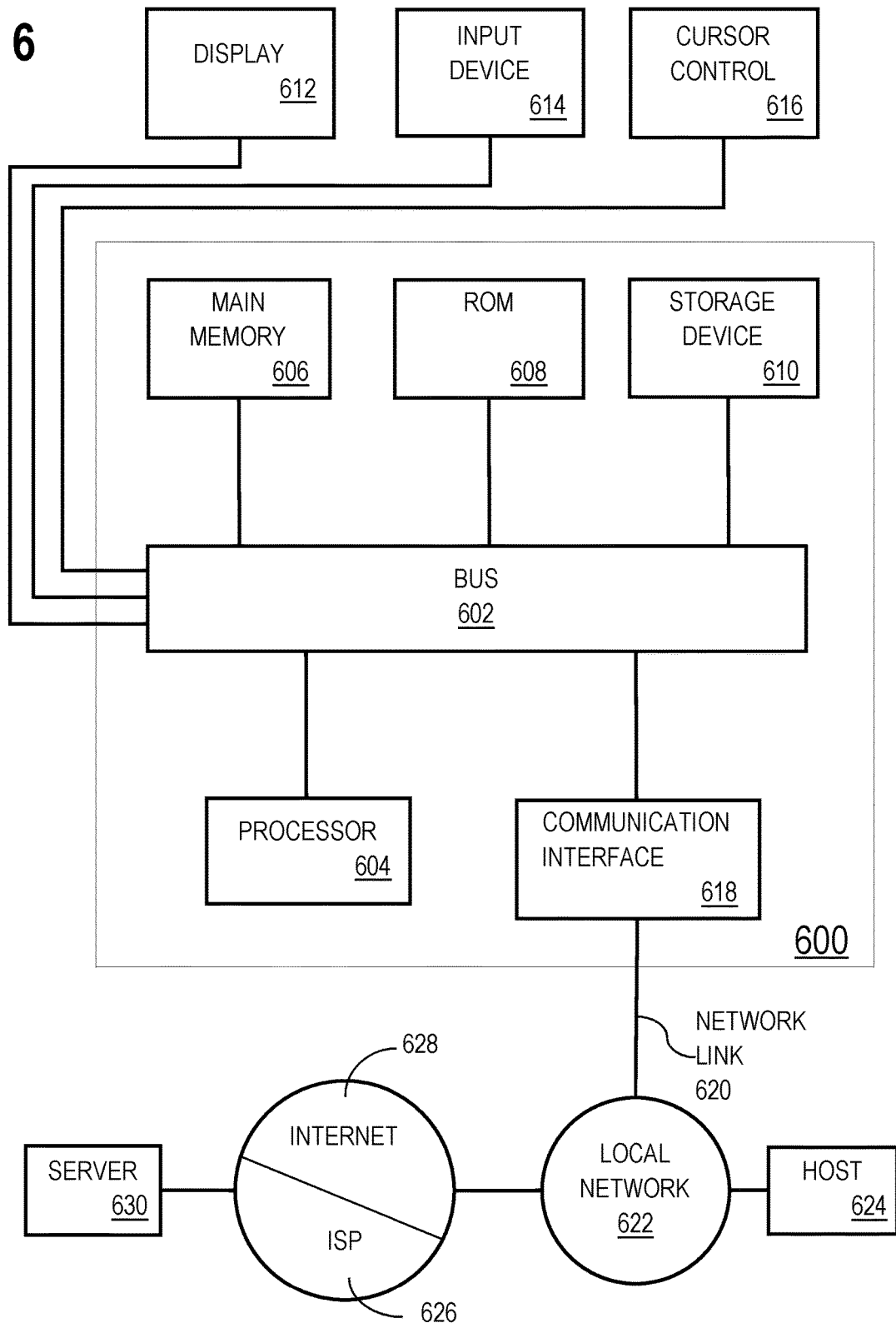
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   obtaining a data transfer request that identifies at least a first application, a second application, and a first data object to be transferred from the first application to the second application, the first data object being of a first object type defined by the first application;
   based on the request, obtaining a mapping that (a) maps object types defined by the first application to (b) object types defined by the second application;
   based on the mapping, determining that the first object type defined by the first application is mapped to a second object type defined by the second application;
   executing a first query to identify a first API call, corresponding to a first API associated with the first application, that retrieves data objects of the first object type from the first application;
   invoking the first API call to obtain the first data object of the first object type;
   migrating the first data object of the first object type to a second data object of the second object type based on the mapping;

executing a second query to identify a second API call, corresponding to a second API associated with the second application, that transmits data objects of the second object type to the second application; and invoking the second API call to transmit the second data object to the second application.

2. The medium of claim 1, wherein migrating the first data object to a second data object further comprises:

executing a third query to determine fields of the first object type;

executing a fourth query to determine fields of the second object type; and mapping the fields of the first object type to the fields of the second object type.

3. The medium of claim 2, wherein mapping the fields of the first object type to the fields of the second object type is performed based on at least one of:

a field name;

a field type; and a field attribute.

4. The medium of claim 1, wherein identifying the first API call comprises determining a path for a first resource that stores the first data object; and identifying the second API call comprises determining a path for a second resource that stores the second data object.

5. The medium of claim 1, wherein the obtaining the mapping is based on:

identifying an incompatibility between the first object type and any object specified in the second API; and requesting the mapping based on identifying the incompatibility.

6. A method, comprising:

obtaining a data transfer request that identifies at least a first application, a second application, and a first data object to be transferred from the first application to the second application, the first data object being of a first object type defined by the first application;

based on the request, obtaining a mapping that (a) maps object types defined by the first application to (b) object types defined by the second application;

based on the mapping, determining that the first object type defined by the first application is mapped to a second object type defined by the second application;

executing a first query to identify a first API call, corresponding to a first API associated with the first application, that retrieves data objects of the first object type from the first application;

invoking the first API call to obtain the first data object of the first object type;

migrating the first data object of the first object type to a second data object of the second object type based on the mapping;

executing a second query to identify a second API call, corresponding to a second API associated with the second application, that transmits data objects of the second object type to the second application; and invoking the second API call to transmit the second data object to the second application.

7. The method of claim 6, wherein migrating the first data object to a second data object further comprises:

executing a third query to determine fields of the first object type;

executing a fourth query to determine fields of the second object type; and mapping the fields of the first object type to the fields of the second object type.

8. The method of claim 7, wherein mapping the fields of the first object type to the fields of the second object type is performed based on at least one of:

a field name;

a field type; and a field attribute.

9. The method of claim 6, wherein identifying the first API call comprises determining a path for a first resource that stores the first data object; and identifying the second API call comprises determining a path for a second resource that stores the second data object.

10. The method of claim 6, wherein the obtaining the mapping is based on:

identifying an incompatibility between the first object type and any object specified in the second API; and requesting the mapping based on identifying the incompatibility.

11. A system, comprising:

one or more processors; and memory storing instructions that, when executed by the one or more processors, cause the system to perform:

obtaining a data transfer request that identifies at least a first application, a second application, and a first data object to be transferred from the first application to the second application, the first data object being of a first object type defined by the first application;

based on the request, obtaining a mapping that (a) maps object types defined by the first application to (b) object types defined by the second application;

based on the mapping, determining that the first object type defined by the first application is mapped to a second object type defined by the second application;

executing a first query to identify a first API call, corresponding to a first API associated with the first application, that retrieves data objects of the first object type from the first application;

invoking the first API call to obtain the first data object of the first object type;

migrating the first data object of the first object type to a second data object of the second object type based on the mapping;

executing a second query to identify a second API call, corresponding to a second API associated with the second application, that transmits data objects of the second object type to the second application; and invoking the second API call to transmit the second data object to the second application.

12. The system of claim 11, wherein migrating the first data object to a second data object further comprises:

executing a third query to determine fields of the first object type;

executing a fourth query to determine fields of the second object type; and mapping the fields of the first object type to the fields of the second object type.

13. The system of claim 12, wherein mapping the fields of the first object type to the fields of the second object type is performed based on at least one of:

a field name;

a field type; and a field attribute.

14. The system of claim 11, wherein identifying the first API call comprises determining a path for a first resource that stores the first data object; and identifying the second API call comprises determining a path for a second resource that stores the second data object.

15. The system of claim 11, wherein the obtaining the mapping is based on:
   identifying an incompatibility between the first object type and any object specified in the second API; and
   requesting the mapping based on identifying the incompatibility.

\* \* \* \* \*